(No Model.) 2 Sheets—Sheet 1.

J. F. MILLER.
METHOD OF MANUFACTURING ORNAMENTAL GLASS.

No. 393,257. Patented Nov. 20, 1888.

WITNESSES,
Alex Mahon,
Joseph A. Ryan.

INVENTOR,
J. F. Miller,
BY
L. M. Ginnabaugh,
Attorney.

(No Model.) 2 Sheets—Sheet 2.

J. F. MILLER.
METHOD OF MANUFACTURING ORNAMENTAL GLASS.

No. 393,257. Patented Nov. 20, 1888.

WITNESSES,
Alex Mahon,
Joseph A. Ryan.

INVENTOR,
J. F. Miller.
By L. W. Ginsabaugh,
Attorney.

UNITED STATES PATENT OFFICE.

JOHN F. MILLER, OF MARTIN'S FERRY, OHIO.

METHOD OF MANUFACTURING ORNAMENTAL GLASS.

SPECIFICATION forming part of Letters Patent No. 393,257, dated November 20, 1888.

Application filed March 10, 1888. Serial No. 266,819. (No model.)

*To all whom it may concern:*

Be it known that I, JOHN F. MILLER, a citizen of the United States of America, residing at Martin's Ferry, in the county of Belmont and State of Ohio, have invented certain new and useful Improvements in Method of Manufacturing Ornamental Glassware, of which the following is a specification, reference being had therein to the accompanying drawings.

My invention relates to an improved method of manufacturing ornamental glassware.

My invention consists in the method hereinafter described of manufacturing ornamental glassware, which consists in first blowing the glass bulb in a corrugated mold, so as to form ridges thereon, then reheating the same, so as to develop the ridges into an opalescent color, then twisting the bulb, so that the ridges will assume a spiral form thereon, and, finally, blowing the article in a ribbed or fluted mold to form grooves and ridges crossing the opalescent spirals in the article.

Figure 1:
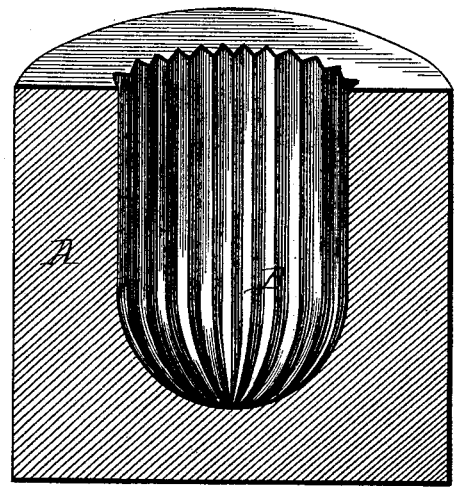
Figure 2:
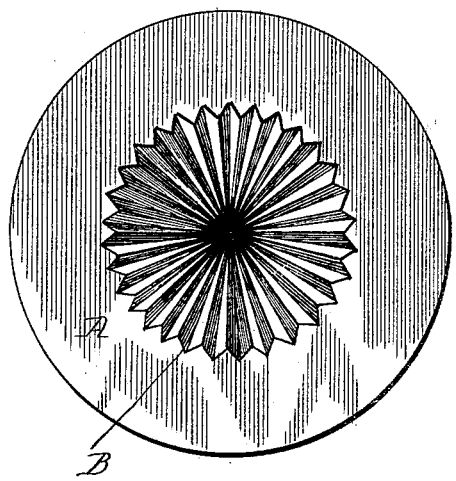
Figure 3:
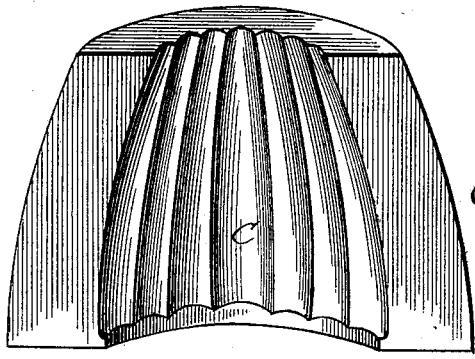
Figure 4:
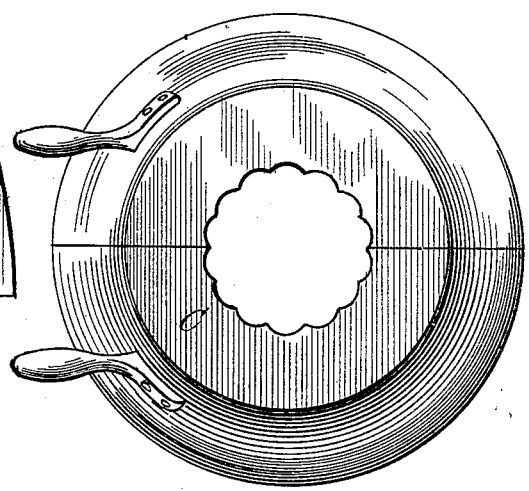
Figure 5:
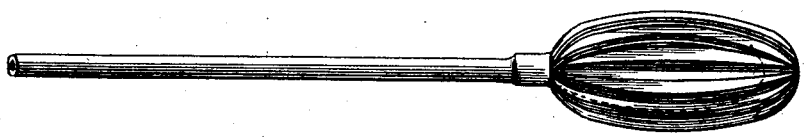
Figure 6:
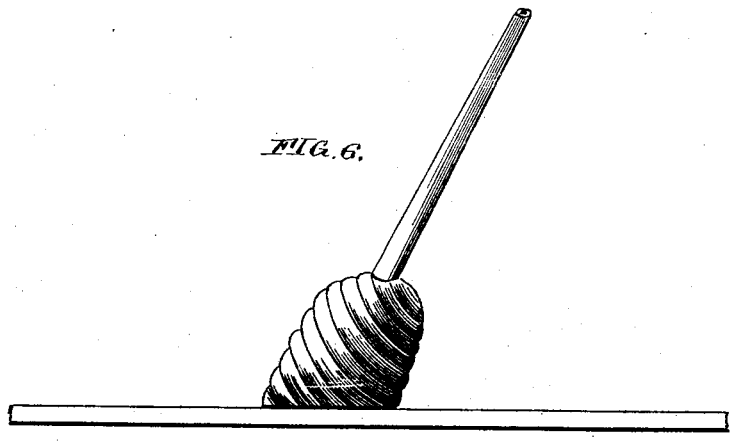
Figure 7:
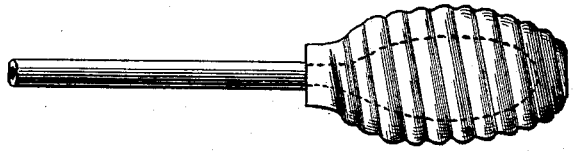

For the purpose of better illustrating my invention, I have shown in Figure 1 a vertical sectional view of a mold in which the glass is first blown to form the ridges. Fig. 2 is a top or plan view of the mold shown in Fig. 1. Fig. 3 is a vertical sectional view of the mold in which the article is finished. Fig. 4 is a top or plan view of the mold shown in Fig. 3. Fig. 5 is a view in perspective of the punty or blow-pipe with the glass bulb thereon after it has been blown in the mold shown in Figs. 1 and 2. Fig. 6 is a view in perspective of the punty or blow-pipe with the glass thereon, showing the operation of forming the spirals thereon. Fig. 7 is a side view of the blow-pipe with the glass thereon, showing the spiral ribs after the twisting or twirling process has been performed.

A indicates a mold having longitudinal ribs or flutes B for forming ribs or ridges on the article in the first step of the process.

C indicates a mold in which the article is finished, and is also provided with longitudinal flutes or corrugations for decorating the outside of the article with flutes or corrugations.

In carrying out my invention, the "blower" gathers on his blow-pipe the proper amount of glass, and after rolling the same on a marver, to bring it to a round and oblong shape, he places it in the mold A, and blows sufficiently hard to cause the hot glass to take the same shape as the inside of the mold A, and as shown in Fig. 5. The corrugated glass bulb is now reheated in the "glory-hole," and the ribs or corrugations, which have become partially cold, are, upon being reheated, turned white, while the main body of the glass, which has not become cooled, retains its original color. After the bulb has been reheated, as above stated, the blower places the lower end of the bulb on the marver, and turns or twirls the blow-pipe, so as to twist the glass and cause the white ribs or flutes to assume a spiral form around the bulb. The bulb is now placed in the mold shown in Figs. 3 and 4, and blown to form longitudinal ribs and grooves, which cross the spiral lines or ribs, thus giving to the article an ornamental and finished appearance.

Articles may be made of a batch of any desired color, and while the spiral rib may not be a pure white, as would be the case if an opalescent batch were used, yet the spiral ribs will be whiter than the intervening spaces, and whiter than the main body of the glass, which is due to the reheating of the bulb on which the initial ribs have been formed.

What I claim, and desire to secure by Letters Patent, is—

The method herein described of manufacturing ornamental glassware, which consists in first blowing the glass bulb in a corrugated mold to form ridges thereon, then reheating the bulb thus formed to develop the ridges into a whiter color than the main body of the article, then twisting or twirling the bulb, so that the ridges will assume a spiral form, and finally blowing the article in a ribbed or fluted mold to form ridges crossing the spiral stripes, as set forth.

In testimony whereof I have affixed my signature in presence of two witnesses.

JOHN F. MILLER.

Witnesses:
CHAS. S. MILLER,
G. A. MCKIM.